United States Patent
Li et al.

(10) Patent No.: US 9,196,051 B2
(45) Date of Patent: Nov. 24, 2015

(54) ELECTRONIC EQUIPMENT WITH IMAGE ANALYSIS FUNCTION AND RELATED METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Jun-Jie Li, Shenzhen (CN); Xue-Shun Liu, Shenzhen (CN); Huan-Huan Zhang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/311,597

(22) Filed: Jun. 23, 2014

(65) Prior Publication Data
US 2014/0376774 A1    Dec. 25, 2014

(30) Foreign Application Priority Data
Jun. 24, 2013    (CN) .......................... 2013 1 02528934

(51) Int. Cl.
*G06K 9/00*    (2006.01)
*G06T 7/00*    (2006.01)

(52) U.S. Cl.
CPC ..... *G06T 7/0085* (2013.01); *G06T 2207/20136* (2013.01)

(58) Field of Classification Search
CPC ................ G06T 7/0085; G06T 7/0042; G06T 2207/10004; G06T 2207/20144; G06T 7/2033; G06T 9/20; G06K 9/6204
USPC ........................................................ 382/103
See application file for complete search history.

(56) References Cited

U.S. PATENT DOCUMENTS 6,128,046 A * 10/2000 Totsuka et al. ................ 348/590
2010/0021068 A1 * 1/2010 Chang et al. .................. 382/199

* cited by examiner

*Primary Examiner* — Samir Ahmed
*Assistant Examiner* — Shaghayegh Azima
(74) *Attorney, Agent, or Firm* — Novak Druce Connolly Bove + Quigg LLP

(57) ABSTRACT

An electronic equipment for analyzing an image inside a light-proof container having a portable electronic device with a display screen therein is provided. The electronic equipment analyzes the gray values of each two adjacent pixels of the image to determine a number of boundary points of an area which is illumined by the display screen, linearly fits a number of straight-lines based on the boundary points in different directions, and determines an area bound by the intersections formed by the straight-lines.

4 Claims, 5 Drawing Sheets

ELECTRONIC EQUIPMENT WITH IMAGE ANALYSIS FUNCTION AND RELATED METHOD

CROSS-REFERENCE TO RELATED APPLICATIONS

This application claims priority to Chinese Patent Application No. 201310252893.4 filed on Jun. 24, 2013 in the China Intellectual Property Office, the contents of which are incorporated by reference herein.

FIELD

The present disclosure relates to electronic equipment, and particularly to electronic equipment and a method including an image analysis function.

BACKGROUND

During testing of a portable electronic device, an image of the portable electronic device can be captured by a capturing unit.

DETAILED DESCRIPTION

Figure 1:
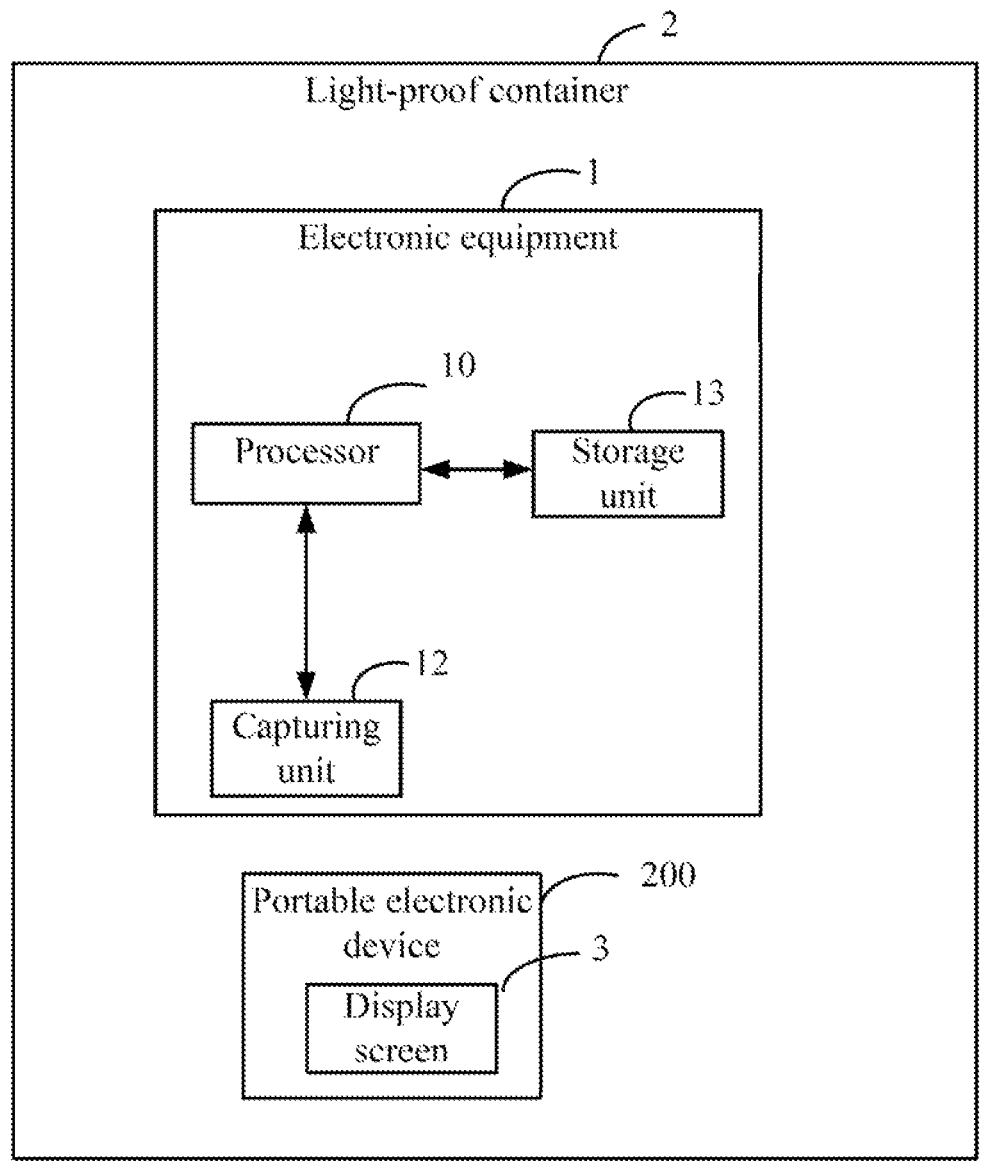
FIG. 1 illustrates a block diagram of an embodiment of an image analysis system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

Embodiments of the present disclosure will be described with reference to the accompanying drawings.

FIG. 1 illustrates an embodiment of an image analysis system. The image analysis system includes electronic equipment 1 and a portable electronic device 200 received in a Light-proof container 2. The portable electronic device 200 includes a display screen 3. In one embodiment, the electronic equipment 1 can be a phone, a panel computer, or the like, having an image capturing function.

The electronic equipment 1 can include a processor 10, a capturing unit 12, and a storage unit 13. The processor 10 can control the electronic equipment 1. The capturing unit 12 captures images. In one embodiment, the capturing unit 12 is a camera. The storage unit 13 stores data, such as images captured by the capturing unit 12.

Figure 2:
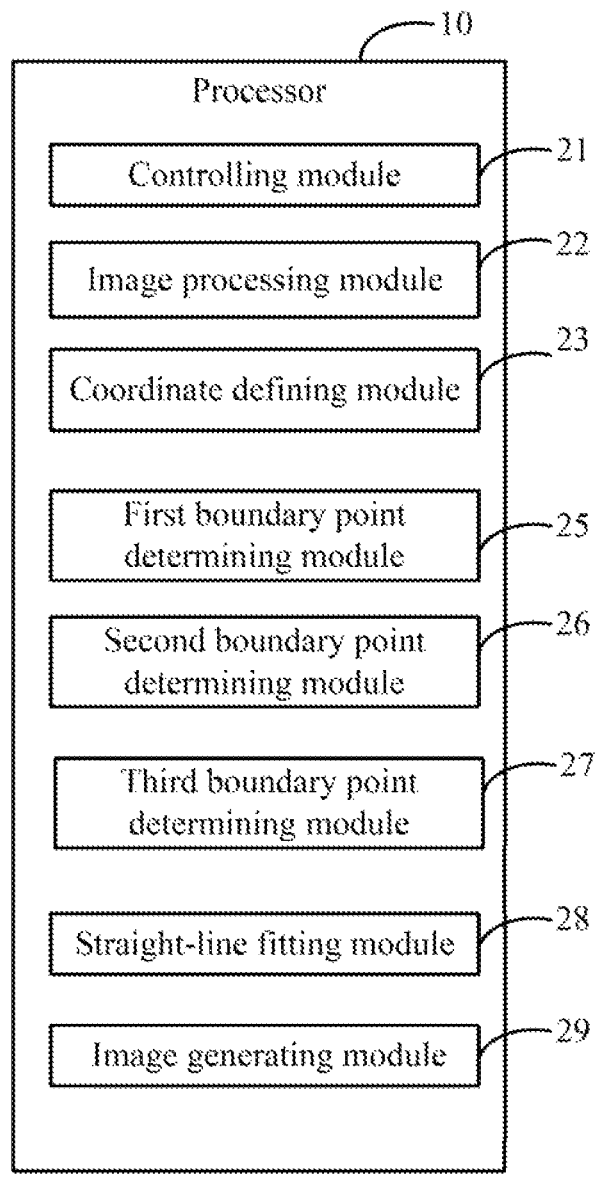
FIG. 2 is a block diagram of a processor of FIG. 1.

Referring to FIG. 2, the processor 10 includes a controlling module 21, an image processing module 22, a coordinate defining module 23, a first boundary point determining module 25, a second boundary point determining module 26, a third boundary point determining module 27, a straight-line fitting module 28, and an image generating module 29.

Figure 3:
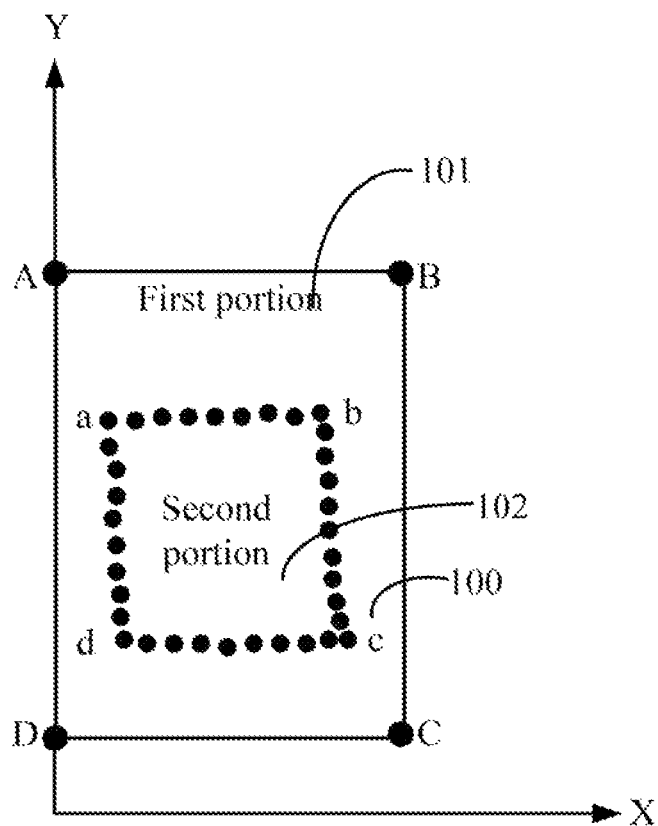
FIG. 3 shows an image captured by a capturing unit.

The controlling module 21 controls the capturing unit 12 to capture an image inside the light-proof container 2 when the display screen 3 of the portable electronic device 200 is lit up. In the embodiment, as shown in FIG. 3, an image 100 captured by the capturing unit 12 can include a first portion 101 corresponding to a background around the display screen 3 of the portable electronic device 200, and a second portion 102 corresponding to the display screen 3 of the portable electronic device 200. Because the image is captured when the display screen 3 of the portable electronic device 200 is lit up, the first portion 101 is darker than the second portion 102.

The image processing module 22 acquires a gray value of each pixel of the captured image 100. In at least one embodiment, because the first portion 101 is darker than the second portion 102, the gray values of the pixels in the first portion 101 are greater than the gray values of the pixels in the second portion 102.

The coordinate defining module 23 defines an XY-coordinate system, and sets the X-axis and the Y-axis according to borders of the image 100. The coordinate defining module 23 further acquires coordinate values of vertices of the image 100. The vertices correspond to corners of the image 100. As shown in FIG. 3, the captured image includes vertices A, B, C, and D corresponding to four respective corners of the image 100.

The first boundary point determining module 25 determines coordinate values of a number of boundary points of the second portion 102 according to differences in gray values between adjacent pixels in the image 100 that are greater than a predefined gray value difference value. In the embodiment, the storage unit 13 stores the predefined gray value difference value. If a gray value difference between two adjacent pixels is greater than the predefined gray value difference value, the first boundary point determining module 25 marks a boundary point whose gray value is smallest, corresponding to the coordinate value between the corresponding adjacent pixels. The boundary point is marked according to every corresponding two adjacent pixels having a gray value difference greater than the predefined gray value difference value.

The second boundary point determining module 26 determines boundary points that are nearest to vertices of the image 100. In the illustrated embodiment, the display screen 3 is rectangular, so the second boundary point determining module 26 determines four boundary points of the second portion 102 nearest to the four respective vertices A, B, C, and D of the image 100. As shown in FIG. 3, four data points a, b, c, and d of the second portion 102 are marked, because the coordinate values of the data points a, b, c, and d are nearest to the coordinate points of the four vertices A, B, C, and D of the image 100, respectively.

The third boundary point determining module 27 determines two paths along the X-axis (hereinafter "X-axis paths"), and two paths along the Y-axis (hereinafter "Y-axis paths"). The X-axis paths are determined according to which of the boundary points a, b, c, and d have Y-values that are closest to each other, and the Y-axis paths are determined according to which of the boundary points a, b, c, and d have X-values that are closest to each other. As illustrated in FIG. 3, the X-values of the boundary points a and d are closest to each other, the X-values of the boundary points b and c are closest to each other, the Y-values of the boundary points a and b are closest to each other, and the Y-values of the boundary points d and c are closest to each other. Thus, the four paths are defined by the boundary points (a, b), (d, c), (a, d), and (b, c). The third boundary point determining module 27 further determines which boundary points are located along the X-axis paths according to a corresponding deviation range of Y-axis values, and further determines which boundary points are located along the Y-axis paths according to a corresponding deviation range of X-axis values. For example, the third boundary point determining module 27 determines which boundary points are located along the X-axis path (a, b) by determining which boundary points have Y-axis values within the deviation range of Y-axis values of the data points (a, b). In one embodiment, the deviation ranges of the X-axis values and Y-axis values can be predetermined.

Figure 4:
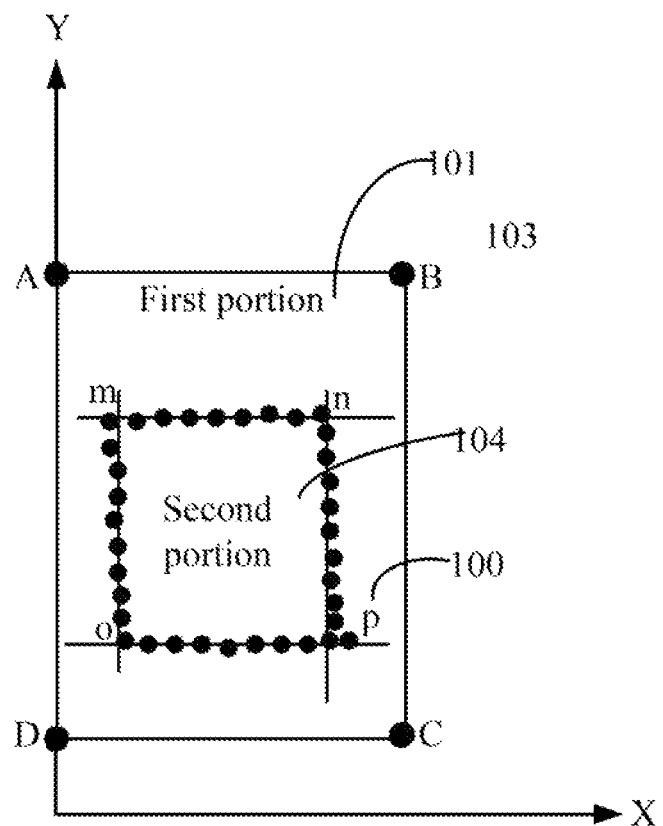
FIG. 4 shows the image of FIG. 3 with fitted lines.

Referring to FIG. 4, the straight-line fitting module 28 linearly fits the number of determined boundary points of each path to form a number of straight lines, and determines intersections formed by the number of straight lines. In the illustrated embodiment, the four straight lines form four intersections m, n, o, and p.

The image generating module 29 determines an area bound by the four intersections m, n, o, and p. In the illustrated embodiment, the image generating module 29 determines a rectangular area 104 whose vertices are the determined four intersections m, n, o, and p as the image corresponding to the second portion 102 illumined by the display screen 3.

Figure 5:
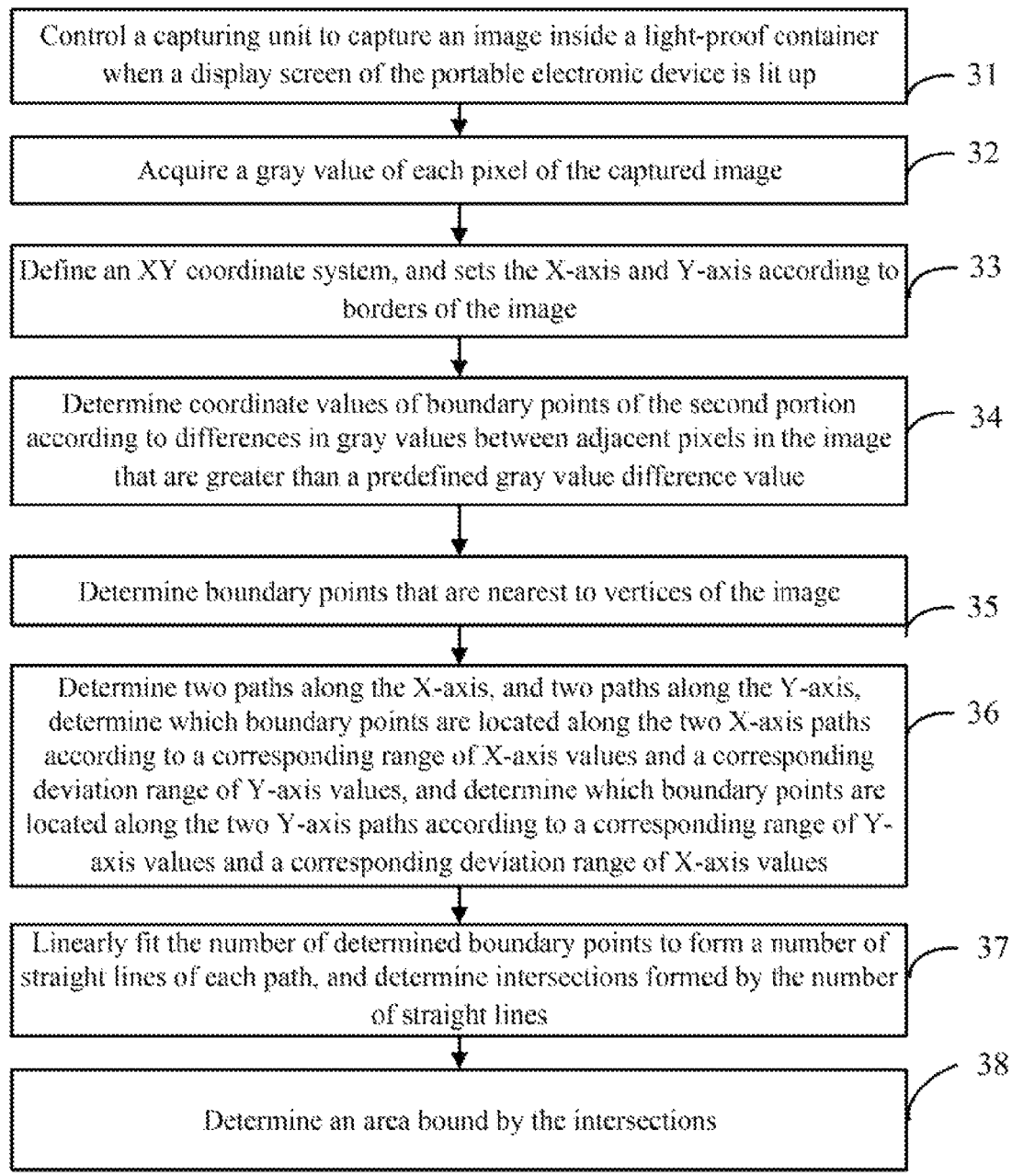
FIG. 5 is a flowchart of a method of analyzing an image implemented by the image analysis system of FIG. 1.

FIG. 5 is a flowchart of a method of analyzing an image implemented by the electronic equipment of FIG. 1.

In block 31, a controlling module controls a capturing unit to capture an image inside a light-proof container when a display screen of the portable electronic device is lit up.

In block 32, an image processing module acquires a gray value of each pixel of the captured image.

In block 33, a coordinate defining module defines an XY-coordinate system, and sets the X-axis and Y-axis according to borders of the image.

In block 34, a first boundary point determining module determines coordinate values of a number of boundary points of the second portion according to differences in gray values between adjacent pixels in the image that are greater than a predefined gray value difference value.

In block 35, a second boundary point determining module determines boundary points that are nearest to vertices of the image.

In block 36, a third boundary point determining module determines two paths along the X-axis (hereinafter "X-axis paths"), and two paths along the Y-axis (hereinafter "Y-axis paths"), determines which boundary points are located along the X-axis paths according to a corresponding range of X-axis values and a corresponding deviation range of Y-axis values, and further determines which boundary points are located along the Y-axis paths according to a corresponding range of Y-axis values and a corresponding deviation range of X-axis values.

In block 37, a straight-line fitting module linearly fits the number of determined boundary points of each path to form a number of straight lines, and determines intersections formed by the number of straight lines.

In block 38, an image generating module determines an area bound by the intersections.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An electronic equipment comprising:
    a storage unit configured to store a predefined gray value difference value;
    a capturing unit configured to capture an image inside a light-proof container having a portable electronic device with a display screen therein, wherein the captured image comprises a first portion corresponding to a background around the display screen of the portable electronic device and a second portion corresponding to the display screen of the portable electronic device, the first portion is darker than the second portion; and
    a processor configured to:
        acquire a gray value of each pixel of the captured image;
        define an XY-coordinate system, and set the X-axis and Y-axis according to borders of the captured image;
        determine coordinate values of a plurality of boundary points of the second portion according to differences in gray values between adjacent pixels in the image that are greater than the predefined gray value difference value;
        determine boundary points that are nearest to vertices of the image;
        determine two paths along the X-axis, and two paths along the Y-axis, determine which boundary points are located along the two X-axis paths according to a corresponding deviation range of Y-axis values, and determine which boundary points are located along the two Y-axis paths according to a corresponding deviation range of X-axis values;
        linearly fit the plurality of determined boundary points to form a plurality of straight lines of each path, and determine intersections formed by the plurality of straight lines; and
        determine an area bound by the intersections.

2. The electronic equipment as described in claim 1, wherein the processor is further configured to control the capturing unit to capture the image inside the light-proof container when the display screen of the portable electronic device is lit up.

3. An image analysis method implemented by an electronic equipment comprising a storage unit configured to store a predefined gray value difference value, and a capturing unit configured to capture an image inside a light-proof container having a portable electronic device with a display screen therein, wherein the captured image comprises a first portion corresponding to a background around the display screen of the portable electronic device and a second portion corresponding to the display screen of the portable electronic device, the first portion is darker than the second portion, the image analysis method comprising:

acquiring a gray value of each pixel of the captured image;

defining an XY-coordinate system, and setting the X-axis and Y-axis according to borders of the captured image;

determining coordinate values of a plurality of boundary points of the second portion according to differences in gray values between adjacent pixels in the image that are greater than the predefined gray value difference value;

determining boundary points that are nearest to vertices of the image;

determining two paths along the X-axis, and two paths along the Y-axis, determining which boundary points are located along the two X-axis paths according to a corresponding deviation range of Y-axis values, and determining which boundary points are located along the two Y-axis paths according to a corresponding deviation range of X-axis values;

linearly fitting the plurality of determined boundary points to form a plurality of straight lines of each path, and determining intersections formed by the plurality of straight lines; and determining an area bound by the intersections.

4. The image analysis method as described in claim 3, further comprising:

controlling the capturing unit to capture the image inside the light-proof container when the display screen of the portable electronic device is lit up.

\* \* \* \* \*